J. R. PURVIS.
STEREOSCOPIC DEVICE.
APPLICATION FILED FEB. 14, 1912.
1,072,990.
Patented Sept. 9, 1913.
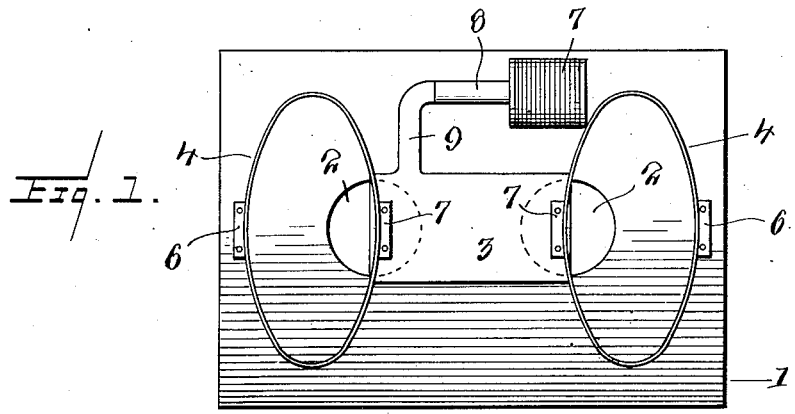
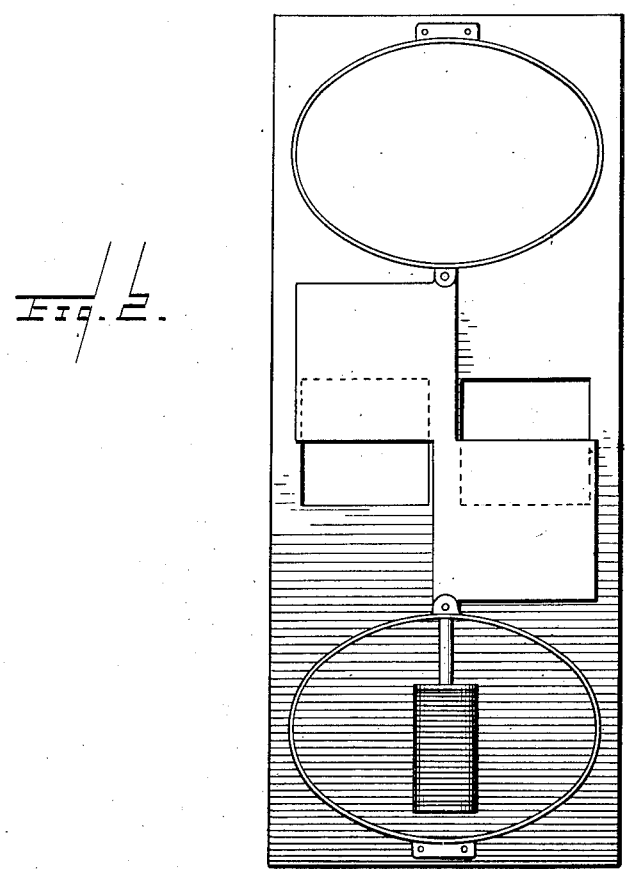
Inventor
J. R. Purvis
By Victor J. Evans
Attorney
Witnesses

UNITED STATES PATENT OFFICE.

JOSEPH R. PURVIS, OF NORWOOD GROVE, MANITOBA, CANADA.

STEREOSCOPIC DEVICE.

1,072,990. Specification of Letters Patent. Patented Sept. 9, 1913.

Application filed February 14, 1912. Serial No. 677,641.

*To all whom it may concern:*

Be it known that I, JOSEPH R. PURVIS, a subject of the King of Great Britain, residing at Norwood Grove, in the Province of Manitoba and Dominion of Canada, have invented new and useful Improvements in Stereoscopic Devices, of which the following is a specification.

My present invention relates to improvements in shutters designed for use with apparatus for exhibiting or viewing what are known as "motion pictures" and other pictures of a like nature.

In carrying out this invention, it is my purpose to provide a device of this type whereby the lines of vision of the right and left eyes of an observer may be alternately opened and closed so that only one picture at a time will be seen, the shutter operating in synchronism with the picture projecting machine to obtain the desired result. Furthermore, I aim to provide a shutter of this type by means of which sight openings may be opened and closed alternately so as to present to the respective eyes of an observer only those pictures which are intended to be viewed by each eye.

The invention also involves the provision of means for actuating the shutter to alternately open and close the openings, and a mechanism for imparting movement to the means initially and controlling the movement of such means subsequent to its initial operation so as to insure the proper movement of the shutter with respect to the operation of the picture projecting or exhibiting machine.

With the above objects in view and others of a similar nature, the invention consists in the construction, combination and arrangement of parts hereinafter set forth in and falling within the scope of the appended claims.

In the accompanying drawings wherein has been illustrated one embodiment of my invention: Figure 1 is a plan view of an apparatus constructed in accordance with the present invention, and Fig. 2 is a similar view of a modified form of the invention.

Similar reference characters designate like parts throughout the several views.

Referring now to the drawing in detail, my improved shutter in the present instance includes a base 1 constructed of wood or any other suitable material and provided with eye openings 2, 2 spaced a sufficient distance from each other to accommodate the eyes of an observer. These openings are alternately opened and closed by means of a shutter 3 arranged upon the base preferably between the openings and designed to control both of said openings so that when one of the openings is completely closed the other will be completely open. The movable shutter 3 in this instance is designed to be reciprocated to effect the opening and closing of the eye openings and to impart movement to the shutter for this purpose and to support the same upon the base in proximity to the sight openings, I have provided means which, in the present embodiment of the invention, comprises a pair of substantially elliptical springs 4, 4 each fixed at one point to the base as at 6 at a suitable distance to one side of the eye openings, and at a diametrically opposite point to one extremity of the shutter 3 as at 7, whereby the springs may act in opposition to each other to vibrate the shutter with respect to the base and alternately open and close the sight openings, and at the same time support the shutter upon the base.

To impart initial movement to the shutter and permit the springs to reciprocate the shutter, and also to control the movement of the shutter under the action of the springs so that the former may operate synchronously with the picture projecting machine, I have herein shown a solenoid 7 electrically connected with the picture machine, (not shown) and adapted to be energized from such machine to facilitate the movement of the shutter, a core or armature 8 being connected to the shutter 3 through the medium of a right angular arm 9 and operable to impart initial movement to the shutter and control the movement thereof from the solenoid.

From the above description taken in connection with the accompanying drawing, it will be seen that movement is first imparted to the shutter from the solenoid, consequently placing the springs 4 under tension to vibrate the shutter across the sight openings to alternately open and close the said openings, the solenoid acting to control the movement of the shutter under the action of the springs and insure synchronism of movement between the shutter and the picture projecting machine, and while I have herein shown and described one form of my invention, by way of illustration, I desire to have it understood that I do not limit myself to all of the details of the construction herein delineated, as modification and variation may be made within the scope of the claims and without departing from the spirit of my invention.

I claim:

1. The combination with a base provided with openings spaced apart, of a reciprocating shutter adapted to open and close such openings alternately, and means for supporting and actuating said shutter to alternately open and close the openings, said means including a device whereby impulses will be given to said shutter periodically.

2. The combination with a base provided with openings, of a reciprocating shutter adapted to open and close such openings alternately, and means including elliptical springs for supporting and actuating said shutter to alternately open and close the openings, and a solenoid for giving impulses to said shutter periodically.

In testimony whereof I affix my signature in presence of two witnesses.

JOSEPH R. PURVIS.

Witnesses:
LENA JAMIESON,
JNO. B. LEPEAN.